United States Patent Office 3,491,488
Patented Jan. 27, 1970

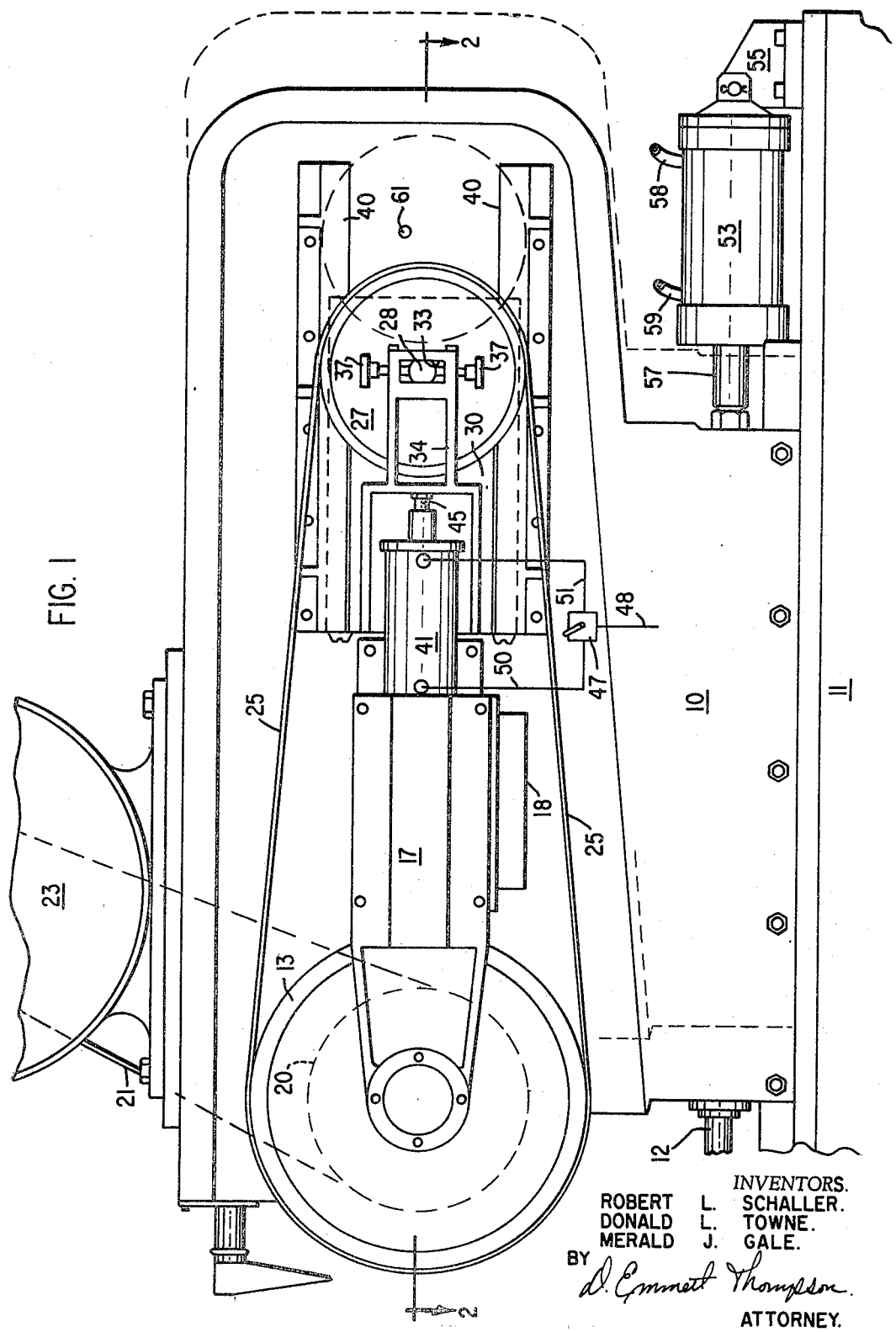

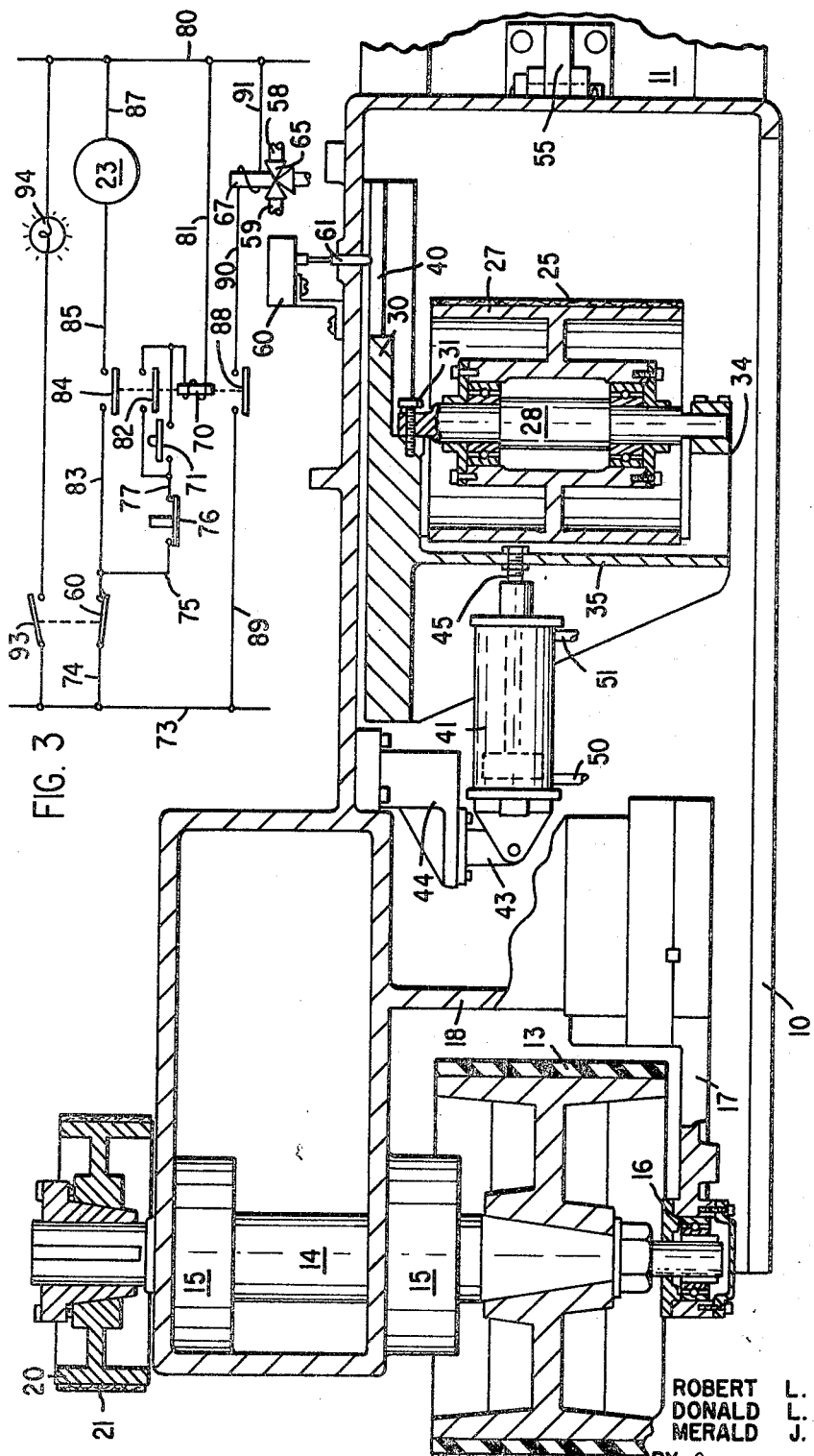

3,491,488
BELT GRINDING MACHINE
Robert L. Schaller, Camillus, Donald L. Towne, North Syracuse, and Merald J. Gale, East Syracuse, N.Y., assignors to Sundstrand-Engelberg, Inc., Liverpool, N.Y., a corporation of Delaware
Filed Jan. 9, 1968, Ser. No. 696,607
Int. Cl. B24b 21/00, 23/06, 25/00
U.S. Cl. 51—135             3 Claims

ABSTRACT OF THE DISCLOSURE

A wheel mount housing movable toward and from grinding position, a fluid operated cylinder for urging the housing against a stop at grinding position. The belt idler roll is yieldingly urged rearwardly from the contact wheel to maintain proper tension on the belt. When the belt breaks, the idler roll is moved from the contact wheel a further distance, this movement actuating control means to stop the belt driving motor and retract the housing from grinding position.

BACKGROUND OF THE INVENTION

Many centerless grinding machines now use an abrading belt, rather than a solid grinding wheel. The belt is trained over a contact wheel and an idler roll journalled in a wheel mount housing movable in the machine frame toward and from grinding position. The idler roll is journalled in a carriage slidably mounted in the housing. A fluid operated cylinder is employed to urge the carriage and idler roll rearwardly from the contact wheel to maintain proper tension on the abrading belt. On occasion, the abrading belt will part, with the result that the work piece sometimes moves off from the work support into engagement with the contact wheel, causing damage thereto.

BRIEF SUMMARY OF THE INVENTION

This invention has as an object a belt grinding machine embodying an arrangement which, upon breaking of the belt, effects rearward movement of the wheel mount housing, and the contact wheel journalled therein, from grinding position and simultaneously effects deenergization of the motor driving the contact wheel. These operations are brought about by control means, which must be manually reset after replacing the belt to effect forward movement of the wheel mount housing to grinding position.

BRIEF DESCRIPTION OF DRAWINGS

FIGURE 1 is a side elevational view of the wheel mount housing.
FIGURE 2 is a view taken on line 2—2, FIGURE 1.
FIGURE 3 is a schematic diagram of the control circuit.

DETAILED DESCRIPTION

A wheel mount housing 10 is slidably mounted on the machine frame 11 for movement toward and from grinding position. When in grinding position, the housing 10 is positioned against a stop 12.
A contact wheel 13 is journalled in the forward portion of the housing 10. The contact wheel 13 is fixedly mounted on a spindle 14 journalled in bearings 15 carried by the housing. The outer end of the spindle 14 is journalled in a bearing 16 carried by an outboard arm 17 rigidly fixed to a boxlike structure 18 extending outwardly from the inner wall of the housing. A driving pulley 20 is fixed to the opposite end of the spindle 14. The spindle is connected by belt 21 to a motor 23 mounted on the top of the housing. The stop is adjusted so the contact wheel 13, in conjunction with the regulating wheel and work rest, not shown, form a proper throat for grinding a work piece of given dimensions.

The abrading belt 25 is trained over the contact wheel 13 and an idler roll 27, journalled on a shaft 28. The inner end of the shaft 28 is pivotally connected to a carriage 30, as by cap screw 31. The opposite end of the shaft 28 is flattened at opposite sides for sliding engagement with the sides of a rectangular aperture 33 formed in the outer arm structure 34 of a yoke arrangement 35, also mounted on the carriage 30. The outer end of the shaft can be adjusted vertically by manipulation of screws 37 to shift the axis of the shaft 28 relative to the axis of the spindle 14 to obtain proper tracking of belt 25.

The carriage 30 is slidably mounted on ways 40 formed on the inner surface of the inner wall of the housing 10. A cylinder 41 is fixed at one end to a bracket 43 carried by an angle block 44 also fixedly secured to the inner wall of the housing. The piston rod 45 is fixed to the yoke 35. A manually operable valve 47 is provided to supply fluid under pressure from line 48, through either line 50, or line 51, to the ends of the cylinder 41. With pressure applied through line 50, the carriage is moved rearwardly from the contact wheel 13 to maintain proper operating tension on the abrading belt 25.

A cylinder 53 is connected at one end to a bracket 55 mounted on the frame 11. The piston rod 57 is connected to the housing 10. Fluid under pressure supplied to the rear end of the cylinder 53 through line 58, effects forward movement of the housing 10 against the stop 12 to maintain the contact wheel 13 in grinding position. Application of fluid pressure to the front end of the cylinder 53, through line 59, effects rearward movement of the housing away from the stop 12 to move the contact wheel 13 in spaced relation to the work piece.

A switch 60 is mounted on the inner wall of the housing for operation by an actuator 61 slidably mounted in the housing wall. The inner end of the actuator 61 extends into the path of movement of the carriage 30. The contacts of switch 60 are normally closed. In the event of the breaking of the abrasive belt 25, the carriage 30 will be moved rearwardly by cylinder 41 and, upon such rearward movement, the carriage 30 engages the actuator 61 to open the contacts of switch 60.

The supply of fluid to the cylinder 53 is controlled by a reversible valve means 65, see FIGURE 3. The valve 65 is controlled by solenoid 67 which, when energized, supplies pressure to the rear end of the cylinder 53, through line 58, urging the housing forwardly to grinding position. Upon deenergization of the solenoid 67, the valve 65 connects line 58 to atmosphere and supplies fluid pressure to line 59 to effect rearward movement of the housing 10.

The solenoid 67 is controlled by a relay 70. The relay is initially energized by a manually operable switch 71. The circuit is from the supply side 73, wire 74, switch 60, wire 75, manually operable stop switch 76, wires 77, switch 71, to relay 70, the opposite side of which is connected to the supply side 80, through wire 81.

The relay 70 is provided with hold contacts 82 connected in parallel with the start switch 71. Upon energization of relay 70, a circuit is completed through switch 60, wire 83, load contacts 84, wire 85, to the motor 23, the opposite side of which is connected to the side 80, through wire 87.

The relay 70 is also provided with load contacts 88 to provide a circuit from side 73, wire 89, contacts 88, wire 90, solenoid 67, wire 91, to the side 80, for actuation of valve 65 to supply pressure through line 58 to cylinder 53.

In the event the abrading belt breaks, the cylinder 41 will move the carriage 30 rearwardly, opening the switch 60, deenergizing relay 70 and opening contacts 84, 88, to deenergize motor 23 and effect reversal of the valve 65 for retraction of the housing 10. A switch 93 is coupled to switch 60 so that, upon opening of the latter, switch 93 closes to energize an indicating lamp 94.

With this arrangement, severance of the abrasive belt results in the housing 10 being immediately moved rearwardly to avoid contact of the work piece with the contact wheel 13, and to deenergize the driving motor 23.

In order to apply a new belt over the contact wheel 13 and the idler 27, it is necessary to move the carriage 30 forwardly. This is accomplished by manual manipulation of the valve 47 to transfer pressure from supply line 48 to line 51, to the rear end of cylinder 41. Upon forward movement of the carriage 30, switch 60 will again close. However, relay 70 will not be energized until the manually operable switch 71 is closed. The machine can not be put in operation until the switch 71 is clsoed.

What we claim is:

1. A belt grinding machine comprising a frame, a housing, a contact wheel journalled in the housing, a motor mounted on said housing and operatively connected to said wheel to effect rotation thereof, said housing being slidably mounted on the frame for movement of the contact wheel forwardly and rearwardly toward and from grinding position, said housing, when moved forwardly to grinding position, engaging a stop, a cylinder and piston structure operatively connected to said housing, valve means normally supplying fluid to one end of said cylinder to urge said housing against said stop, said valve means being reversible to supply fluid to the opposite end of the cylinder to move said housing rearwardly from said stop, a carriage mounted in said housing, an idler pulley journalled in said carriage, an abrasive belt trained over said contact wheel and said pulley, said carriage being slidably mounted in the housing for movement of said idler pulley toward and from said contact wheel, a piston and cylinder structure operatively connected to said carriage for urging the same rearwardly from said contact wheel to maintain said abrading belt under proper tension and to move said carriage rearwardly from belt tensioning position upon breaking of the belt, and control means operable, upon movement of said carriage from belt tensioning position, to effect reversal of said valve means and deenergization of said motor.

2. A belt grinding machine as set forth in claim 1, wherein said control means includes a relay having hold and load contacts, an operating circuit for said motor, and valve means connected through said load contacts, a normally closed switch mounted in said housing, a normally open, manually operable, switch connected in series with said first switch and in parallel with said relay hold contacts, said carriage being operable, upon movement rearwardly from belt tensioning position, to open said normally closed switch.

3. A belt grinding machine comprising a frame, a housing mounted on said frame, a contact wheel and an idler wheel journalled in said housing, an abrasive belt trained over said wheels, a motor carried by said housing and operatively connected to said contact wheel to effect rotation thereof, said housing being movable toward and from grinding position, means operable to move said housing to grinding position for abrading engagement between said belt and the work being ground, and housing retracting means operable upon and responsive to severance of said belt to move said housing from grinding position.

References Cited

UNITED STATES PATENTS 2,783,593  3/1957  Hercik _____ 51—135
2,791,070  5/1957  Schaller _____ 51—148 X OTHELL M. SIMPSON, Primary Examiner U.S. Cl. X.R.

51—148